United States Patent [19]

DeSantis

[11] Patent Number: 4,492,152
[45] Date of Patent: Jan. 8, 1985

[54] ROTATABLE COOKING DEVICE

[76] Inventor: Michelangelo DeSantis, 9 Ave. A, Port Washington, N.Y. 11050

[21] Appl. No.: 481,374

[22] Filed: Apr. 1, 1983

[51] Int. Cl.$^3$ .............................................. A47J 37/06
[52] U.S. Cl. ...................................... 99/397; 99/402; 99/449
[58] Field of Search ................. 99/395, 396, 397, 398, 99/402, 449; 403/91, 92, 85; 292/156, 162, 262, DIG. 44

[56] References Cited

U.S. PATENT DOCUMENTS

| | | |
|---|---|---|
| 557,096 | 3/1896 | Aldrich . |
| 695,096 | 3/1902 | Faivre . |
| 870,117 | 11/1907 | Miller . |
| 1,404,916 | 1/1922 | Warner ................................ 99/398 |
| 1,465,007 | 8/1923 | Sjolin ................................... 99/398 |
| 1,714,064 | 5/1929 | Warner ................................ 99/398 |
| 1,786,345 | 12/1930 | Itzi ....................................... 99/398 |
| 2,636,841 | 5/1953 | Boyce ................................... 99/397 |
| 2,826,981 | 3/1958 | Chick ................................... 99/397 |
| 2,849,947 | 9/1958 | Bork ................................ 292/162 X |
| 3,025,782 | 3/1962 | Stall ..................................... 99/339 |
| 3,091,170 | 5/1963 | Wilson ................................. 99/390 |
| 4,144,870 | 3/1979 | Reynolds ........................ 99/391 X |

FOREIGN PATENT DOCUMENTS 13545 of 1914 United Kingdom ................... 99/449

Primary Examiner—Billy J. Wilhite
Assistant Examiner—Christine A. Peterson
Attorney, Agent, or Firm—Hubbell, Cohen, Stiefel & Gross

[57] ABSTRACT

A cooking device (10) disposable above a heating means for cooking an article of food (32) comprises a grill assembly (12) comprising first and second grills (16, 18) and means (44, 48) for releasably securing the grills (16, 18) together in confronting spaced relation whereby the article (32) to be cooked is releasably securable in the space between the grills (16, 18), a post (80) having one end secured to the grill assembly (12), a frame (14) having an opening (58) for receiving the grill assembly (12), the frame (14) defining a channel (66) along one side thereof for slidably receiving the other end of the post (80), a pivot arm (90) rotatably secured at one end to the frame (14) and at the other end to a side of the grill assembly (12) substantially at the midpoint thereof, and handle means (34) secured to the grill assembly (12) for rotating the assembly substantially 180° about the axis thereof aligned with the rotation axis of the other end of the pivot arm (90) for alternately exposing opposite surfaces of the food article (32) to the heating means, the post (80) traversing the channel (66) during each rotation of the grill assembly (12).

17 Claims, 10 Drawing Figures

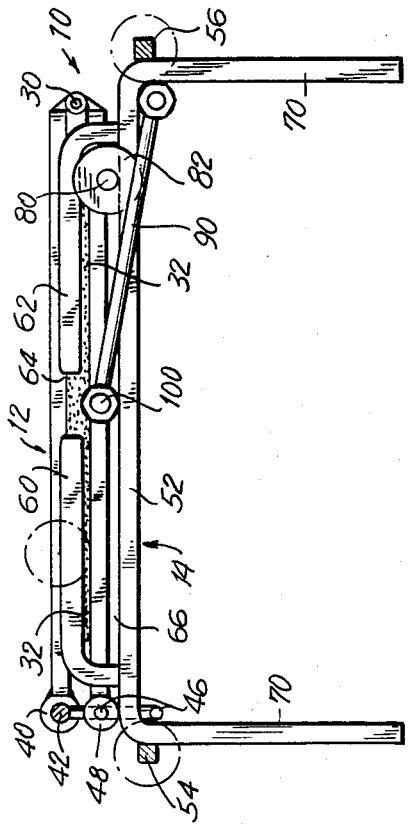

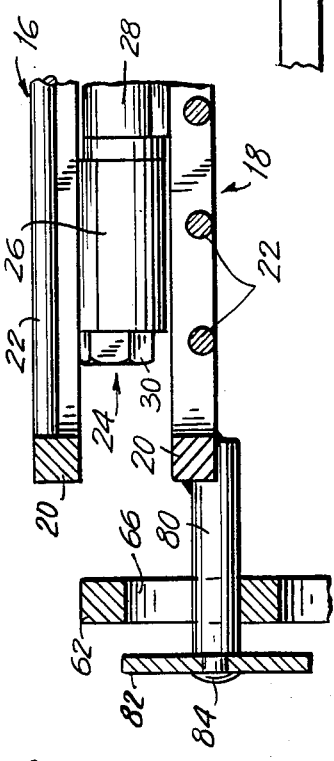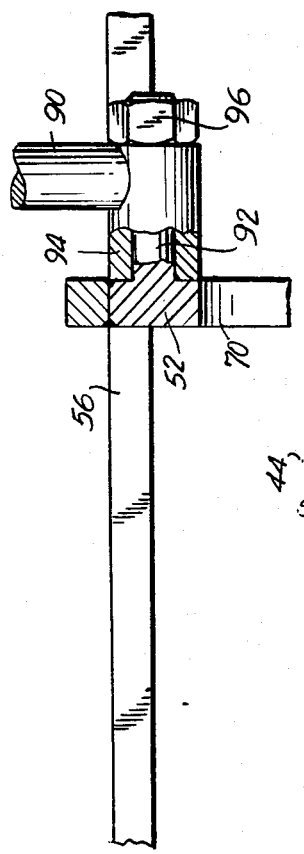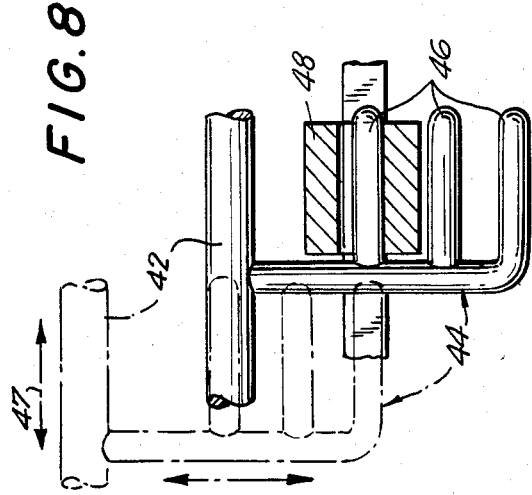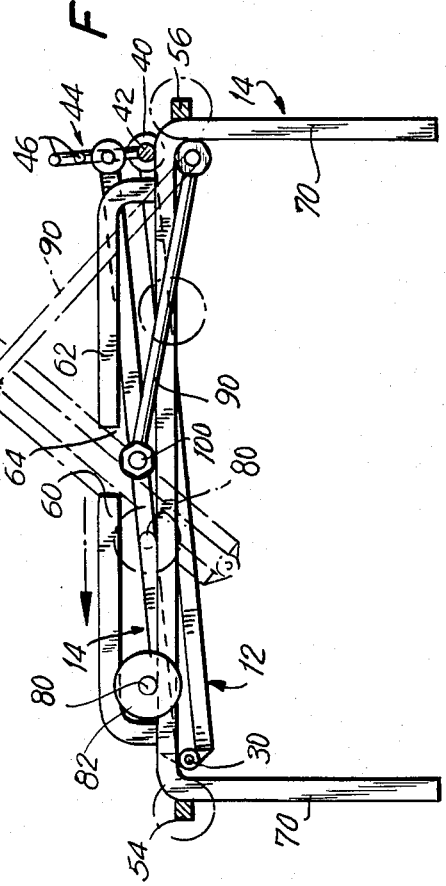

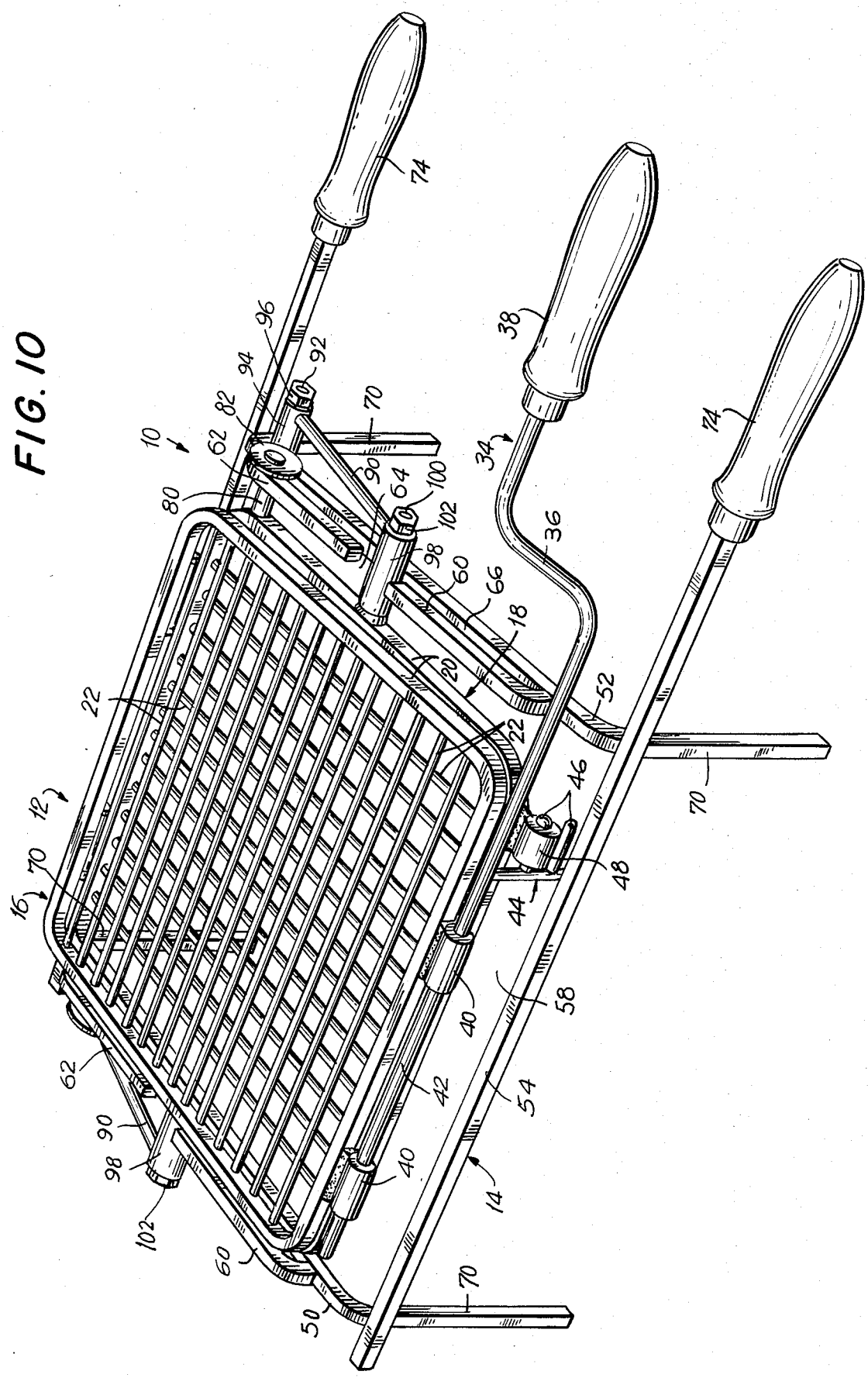

ROTATABLE COOKING DEVICE

This invention pertains to grills, and more particularly to grills incorporating means for rotating the food articles for alternately exposing opposite sides thereof to the heat source.

BACKGROUND ART

Cooking, and particularly barbecuing, requires rotation of the food articles being cooked to alternately expose the top and bottom surfaces thereof. As a result of the wide use of portable barbecues, efforts have been made to develop a portable barbecue grill incorporating means for rotating the food articles during the cooking process. An early arrangement is disclosed in U.S. Pat. No. 695,096 issued to Faivre. In Faivre, two grills, each comprising the usual frame and plurality of cross bars, are releasably secured in face to face relation, the articles to be cooked being disposed between the grills. A pivot frame having a handle is pivotally secured to the midpoints of opposite sides of one of the grills. Latch means on the pivot frame cooperate with a receiving member on one grill for releasably retaining the grills in a horizontal position. To rotate the grills, the latch is released, whereupon the grills are free to pivot in the pivot frame about the pivot points. After the grills have been rotated, the latch member is reinserted into a second receiving member on the other side of the grill for again securing the grills in the horizontal position. A similar arrangement is disclosed in U.S. Pat. No. 557,096 issued to Aldrich. While the Aldrich and Faivre devices serve their intended purpose, they are somewhat cumbersome as they do not incorporate any means for supporting the grill above the flame.

U.S. Pat. No. 2,826,981 issued to Chick discloses a rotatable grill disposable over a barbecue pit. More particularly, the Chick arrangement comprises the usual two grills releasably secured together, with the food articles disposable between the grills. A pivot bar is secured to one of the grills along its longer axis, the ends of the pivot bar extending beyond the grill on both sides. A handle bar is secured to the edge of one of the grills in parallel relation to the pivot bar, the ends of the handle bar also extending beyond the grill on both sides thereof. In use, the grill is disposed above a barbecue pit having opposite vertical walls, with only the ends of the pivot bar and handle bar resting on the walls. The grill is rotated for cooking both sides of the food articles by manipulating the handle bar for rotating the grills 180° about the pivot bar until the handle bar again comes to rest on the upper walls of the barbecue pit on the other side of the pivot bar. A similar arrangement is disclosed in U.S. Pat. No. 3,025,782 issued to Stall. While the Chick and Stall devices incorporate means for supporting the device above the flame, they are deficient in certain respects. In particular, during rotation, half the width of the grill drops below the horizontal with the possibility of interference with the flame. This requires the device to be placed sufficiently high above the flame to avoid such interference with the consequence that the cooking process is slowed. In addition, it will be apparent that the Chick and Stall devices may only be used with barbecue pits where the walls are properly spaced to support the ends of the pivot and handle bars.

U.S. Pat. No. 2,638,841 issued to Boyce discloses a rotatable grill which employs a motor to effect rotation. Such a grill is only usable in proximity to a source of electricity. In addition, during rotation, as in the Chick and Stall devices described above, half the width of the grill extends below the horizontal, with the consquence that the grill must be supported sufficiently high above the flame to avoid interference therewith.

U.S. Pat. No. 3,091,170 issued to Wilson discloses an arrangement comprising two releasably mated rectangular grills and a pair of rods secured to opposite sides of one of the grills substantially at the midpoints thereof. A pair of frame supports extend upwardly on either side of the joined grills, each frame support having a hole for receiving one of the rods. The free end of one of the rods is bent back toward its frame support which is provided with an additional plurality of holes for receiving the free end. By releasing the free end from these holes, the grills may be rotated to a new position whereupon the free end of the rod may be reinserted into another hole. Although the patent discloses that the grills may be rotated to a vertical position, there is no disclosure nor is there apparently any way for rotating the grills 180°. In addition, when the grill is in the vertical position, it suffers from the same deficiences as the above mentioned devices, namely, half of the width of the grill extends beneath the horizontal.

U.S. Pat. No. 870,117 issued to Miller and U.S. Pat. No. 4,144,870 issued to Reynolds disclose arrangements for raising and lowering a cooking grill to adjust the spacing therefor relative to the heat source. However, neither discloses means for rotating the grill 180°. In U.S. Pat. No. 4,144,870, for example, heat sources are provided both above and below the grill. In U.S. Pat. No. 870,117, the grill is movable to a substantially vertical position, but cannot be fully rotated.

THE DISCLOSURE OF THE INVENTION

The present invention is for a novel cooking device particularly adapted for cooking over an available flame, such as a barbecue pit or fireplace, and which incorporates means for rotating the food articles for alternately exposing opposite sides thereof to the flame. In a basic embodiment, the cooking device of the invention comprises a grill assembly having first and second grills releasably secured together in confronting spaced relation whereby the articles to be cooked are releasably securable in the space between the grills; a post having one end secured to the grill assembly; a frame having an opening for receiving the grill assembly, the frame defining a channel along one side thereof for slidably receiving the other end of the post; a pivot arm rotatably secured at one end to the frame and at the other end to a side of the grill assembly substantially at the midpoint thereof; and a handle means secured to the grill assembly for rotating the assembly substantially 180° about the axis thereof aligned with the rotation axis of the other end of the pivot arm for alternately exposing opposite surfaces of the food articles to the heat source, the post traversing the channel during each rotation.

Because of the novel structure of the invented cooking device, during rotation only a very small portion of the grill assembly extends below the plane defined by the grill assembly in its horizontal position, whereby the grill assembly may be placed in proximity to the heat source without fear of interference as the grill assembly is rotated. In a preferred embodiment, the frame assembly is provided with depending legs for supporting the device whereby the grill is readily and easily positioned over the flame. If desired, the legs may be extendable for adjusting the height of the grill assembly relative to the flame and/or collapsable to reduce the volume of the device for storage. In addition to the handle means for rotating the grill assembly, the device preferably includes additional handles secured to the frame which may be grasped for moving the device as desired.

Further features and advantages of the cooking device in accordance with present invention will be more fully apparent from the following detailed description and annexed drawings of a presently preferred embodiment thereof.

BRIEF DESCRIPTION OF THE DRAWINGS

In the drawings, wherein like numerals represent like parts:

FIG. 3 is a view, partly in cross section, taken substantially along the lines 3—3 in FIG. 1;

FIG. 4 is a view, partly in cross section, taken substantially along the lines 4—4 in FIG. 1;

FIG. 5 is a view, partly in cross section, taken substantially along the lines 5—5 in FIG. 1;

FIG. 6 is a fragmentary view, partly in cross section, taken substantially along the lines 6—6 in FIG. 1;

FIG. 7 is another fragmentary view, partly in cross section, taken substantially along the lines 7—7 in FIG. 1;

FIG. 8 is another fragmentary view, partly in cross section, taken substantially along the lines 8—8 in FIG. 5;

FIG. 9 is a view similar to FIG. 3 showing the manner of rotating the grill; and FIG. 10 is a perspective view of the preferred grill of FIGS. 1-9.

BEST MODE FOR CARRYING OUT THE INVENTION

Figures 1, 2:
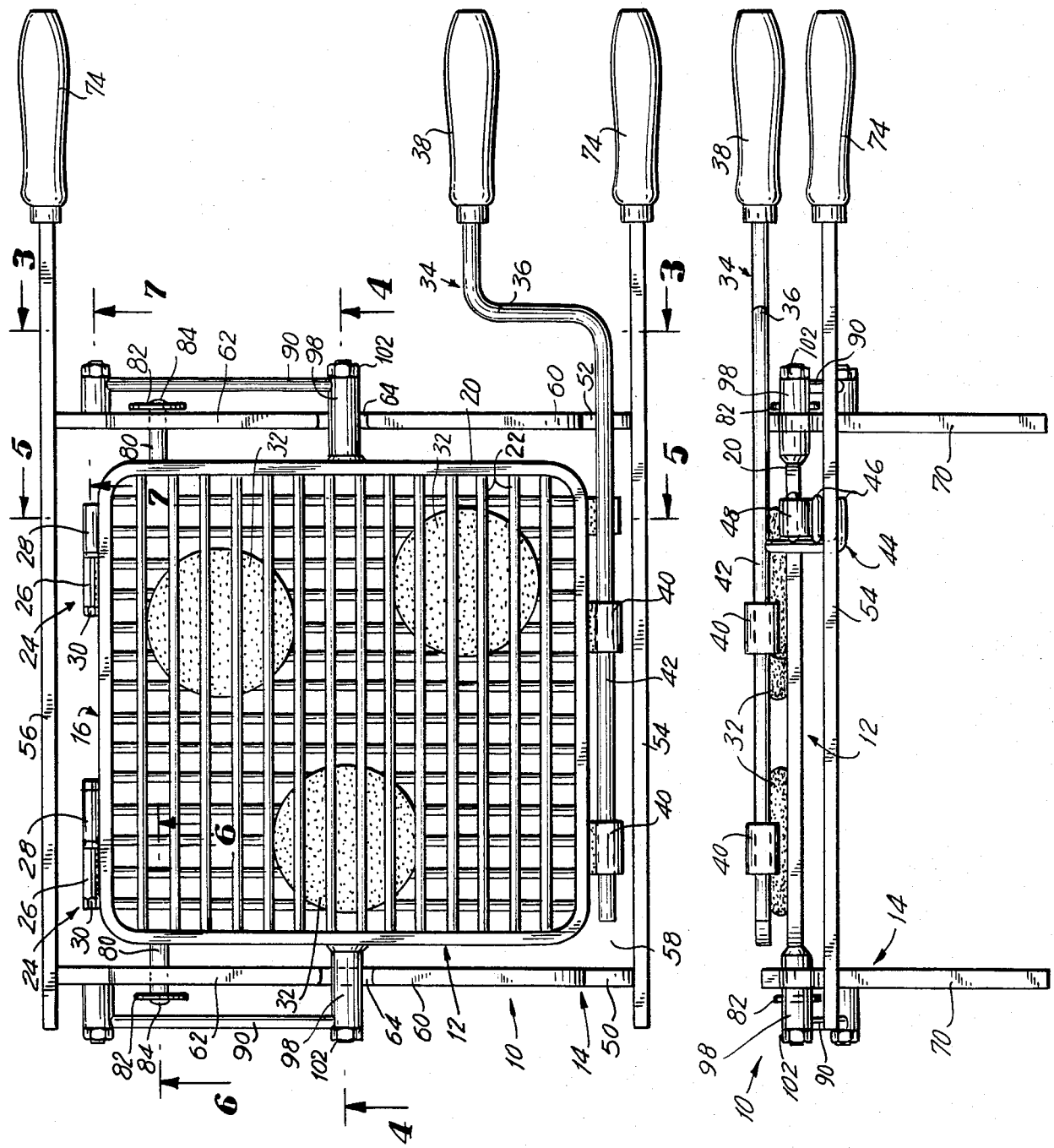
FIG. 1 is a top plan view of a preferred portable grill in accordance with the present invention.
FIG. 2 is a side elevational view thereof.

Referring now to the drawings, and initially to FIGS. 1-3 and 10 thereof, the preferred portable grill in accordance with the present invention is generally designated by the reference numeral 10. The portable grill 10 comprises two main components, a grill assembly 12 and a frame 14.

Grill assembly 12 comprises a pair of preferably rectangular, equal sized grills 16, 18, each grill having a continuous member 20 defining the perimeter thereof and a plurality of cross bars 22 extending between opposite sides of the member 20. As best shown in FIGS. 1 and 10, the cross bars 22 of the grill 16 are orthogonal to the cross bars 22 of the grill 18 whereby the grills 16, 18 present a grid pattern when disposed in confronting relation. In a manner well known in the art, the grills 16, 18 may be comprised of chrome plated steel with the cross bars 22 secured to the perimeter members 20 by any suitable means, such as welding.

The grills 16, 18 are secured together along one edge for relative pivotal movement by a pair of hinges 24, the construction of such hinges being well known in the art. In the embodiment illustrated in the drawings, each hinge 24 comprises a tubular member 26 secured to the grill 16, an internally threaded tubular member 28 secured to the grill 18, and a bolt 30 extending through the member 26 and threadably received in the member 28. It will be apparent that the hinges 24 accommodate relative pivotal movement of the grills 16, 18 about the hinge axis such that the edges of the grills opposite the hinges may be separated for disposing the food to be cooked, shown in the drawings as three hamburgers 32, in the space between the grills.

Referring now to FIGS. 2, 8 and 10, the portable grill 10 also includes a handle member 34 comprising a generally S-shaped rod 36 having a handle 38 secured to one end. Handle 38 may be secured to rod 36 in any suitable manner, although preferably handle 38 is rotatably secured to rod 36, means for effecting such rotatable securement being well within the capabilities of the skilled art worker. A pair of tubular members 40 secured, as by welding, to the edge of the grill 16 opposite the hinges 24 slidably receive the elongate section 42 of the rod 36 for securing handle member 34 to grill assembly 12. As best shown in FIG. 8, a locking member 44 depends from the rod section 42, the member 44 having a plurality of fingers 46 axially aligned with rod section 42. A tubular member 48 having an internal diameter dimensioned to receive the fingers 46 is secured, as by welding, to the edge of the grill 18 on the same side as the handle member 34. The edges of the grills 16, 18 opposite the hinges 24 may be releasably secured together by inserting one of the fingers 46 in the tubular member 48, the spacing between the grills 16, 18, being adjustable for accommodating food articles of different sizes by inserting the appropriate finger. To retract the finger 46 from the member 48 for separating the grills 16, 18, the handle member 34 is moved to the left in FIG. 1 (arrow 47 in FIG. 8), such movement being accommodated by sliding of rod section 42 in tubular members 40. By reversing this procedure, the same or a different finger 46 may be inserted into the tubular member 48 for again releasably securing grills 16, 18.

Frame 14 comprises side bars 50, 52 and end bars 54, 56 constructed, for example, of chrome plated steel, and secured together as by welding. As shown, the side bars 50, 52 and end bars 54, 56 define a rectangular opening 58 sufficiently large to receive with clearance the grill assembly 12 when the grills 16, 18 are releasably secured in confronting spaced relation (FIGS. 1 and 10). Four legs 70 depend from the junctions of side bars 50, 52 and end bars 54, 56 for supporting the grill assembly 12 over any suitable heat source, such as a charcoal pit, fireplace, etc. For this purpose, the legs 70 may be extendable, the construction of extendable legs 70 being well within the capabilities of the skilled art worker. Like the other components of the frame 14, the legs 70 may be comprised of chrome plated steel and secured to the aforementioned junctions in any suitable fashion, such as welding, or preferably by being integrally formed with side bars 50, 52. If desired, legs 70 may be collapsible to reduce the volume of the device 10 for storage purposes, the construction of such collapsible legs also being well known to those skilled in the art. As shown, the ends of the end bars 54, 56 joined to the side bar 52 are elongated and handles 74 are secured to the ends of these elongated portions. By grasping one handle 74 with each hand, the portable grill 10 is easily lifted for movement from one location to the next.

As best shown in FIGS. 1, 3 and 10, a pair of generally L-shaped members 60, 62 are secured to the upper surface of each side bar 50, 52 for defining channels 66 on either side of frame 14. More particularly, and referring to the side bar 52 (FIGS. 3 and 10), the shorter leg of each L-shaped member 60, 62 is secured near one end of side bar 52 such that the longer legs are in spaced confronting relation for defining a space 64 therebetween substantially at the midpoint of side bar 52, the space 64 communicating with the channel 66 defined between the side bar 52 and the members 60, 62. A similar construction applies to the side bar 50.

Portable grill 10 also includes a pair of posts 80 extending from either side of grill assembly 12 and received in channels 66. As best shown in FIGS. 1, 3, 6 and 10, each post 80 is secured to grill assembly 12 by welding one end thereof to the perimeter member 20 of the grill 18. Referring particularly to FIG. 6, each post 80 preferably comprises an internally threaded tubular member. A washer 82 is secured to the free end of each post 80 by a bolt 84 threadably received therein, the washers 82 defining enlargements for retaining posts 80 in channels 66.

A pair of pivot arms 90 are rotatably secured at one end to the frame 14 and at the other end to the grill assembly 12. More particularly, and as best shown in FIGS. 1, 4, 7 and 10, each pivot arm 90 is rotatably secured to the frame 14 near one end of its corresponding side bar 50, 52. Referring to FIG. 7, wherein the pivot arm 90 secured to the side bar 52 is illustrated, rotatable securement is effected by a cylindrical post 92 secured to bar 52 and threaded at its free end, and a tubular sleeve 94 secured to one end of pivot arm 90 and disposed about the post 92, there being sufficient clearance between sleeve 94 and post 92 to accommodate rotation of the sleeve about the post. Sleeve 94 is retained on post 92 by a nut 96 received on the threaded end of the post. Post 92 and sleeve 94 may be comprised of chrome plated steel and secured, respectively, to side bar 52 and pivot arm 90 as by welding. It will be appreciated that the other pivot arm 90 is rotatably secured to the side bar 50 in a similar fashion.

Referring now to FIGS. 1, 4 and 10, the other end of each pivot arm 90 is secured, as by welding, to a tubular sleeve 98. The sleeve 98 is disposed about a cylindrical post 100 secured to the grill 18. More particularly, the post 100 is secured, as by welding, to one side of the perimeter member 20 substantially at the midpoint thereof. Like the post 92, post 100 is threaded at its free end for receiving a nut 102 for retaining sleeve 98 on post 100.

Having described the construction of the preferred portable grill 10 in accordance with the present invention, the operation thereof will now be described. Grills 16 and 18 are initially separated by first manipulating handle 38 to effect axial movement of rod section 42 for retracting finger 46 from tubular member 48, and then lifting handle 38 for pivoting grill 16 about the hinges 24. The articles to be cooked, shown in the drawings as three hamburgers 32, are then disposed between the grills 16, 18, whereupon the grill 16 is pivoted back toward the grill 18 until the grill 16 rests on the hamburgers. The handle 38 is then manipulated to again effect axial movement of rod section 42 for moving the appropriate finger 46 into the tubular member 48 thereby releasably securing grills 16, 18 together.

Using legs 72, grill assembly 12 is placed over a suitable heat source, such as a charcoal pit, fireplace flame, etc. Such placement is facilitated by the handles 74 which may be grasped by the user when moving the device 10. As is well known in the cooking art, the side of the hamburgers 32 facing the flame will cook faster than the side facing away. It is accordingly desirable to rotate the food articles one or several times during the cooking process. In accordance with the present invention, and as best shown in FIGS. 9 and 10, this is readily and easily accomplished with the portable grill 10 of the present invention.

Rotation of grill assembly 12 is effected by grasping handle 38 and moving it through an arc as indicated by the arrow 104 in FIG. 9. It will be apparent that during such rotation, seating of posts 80 on the bottom defining walls of channels 66 limits the extent to which grill assembly 12 drops below the horizontal plane defined by the grill assembly in its normal or cooking position (FIG. 10). Therefore, as handle 38 is lifted to rotate grill assembly 12, pivot arms 90 move upward, such movement being accommodated at one end by the rotatable securement of sleeves 94 to posts 92, and at the other end by the spaces 64 which allows sleeves 98 to be lifted out of channels 66 (FIG. 9). As handle 38 moves through its arc, grill assembly 12 begins to rotate about the axis aligned with posts 100, the posts 100 being rotatable in the sleeves 98 as is more fully described above. At the same time, the posts 80 traverse the channels 66 from one end (FIG. 10) toward the opposite end (FIG. 9). As the posts 80 approach the opposite ends of their respective channels 66, the sleeves 98 and posts 100 received therein descend toward the spaces 64, with the posts 98 passing through spaces 64 and coming to rest on the side bars 50, 52 as the posts 80 simultaneously seat in the opposite ends of the channels 66. At this point, the grill assembly 12 has been rotated 180°, and the opposite sides of the hamburgers 32 are exposed to the flame. The grill assembly 12 may again be rotated by simply lifting the handle 38 and moving it back through the arc traversed during the initial rotation described above. Obviously, as many rotations as are necessary may be made.

Because of the novel arrangement of the present invention, as the the grill assembly 12 is rotated only a relatively small portion of the grill assembly extends beneath the horizontal plane defined by the assembly 12 in its cooking position. Consequently, during rotation there is little or no possibility of interference between grill assembly 12 and the heat source disposed therebeneath, whereby grill assembly 12 may be placed in proximity to the heat source and need not be removed from the heat source during rotation.

When the hamburgers 32 are fully cooked, the device 10 may be removed from the flame by grasping handles 74, whereupon the grills 16, 18 may be separated in the manner more fully described above.

It should also be noted that due to the construction of the device 10, all the parts thereof may be readily disassembled for cleaning. The simplified consutruction of the device 10 also allows the device to be sold in disassembled form for subsequent assembly by the ultimate user.

Having read the foregoing description, those skilled in the art will appreciate that numerous changes and modifications may be made in the preferred portable grill 10 without departing from the spirit and scope of the present invention. For example, the frame 14 described above may be replaced with a modified frame to accommodate retrofitting of the device 10 in conventional barbecue grills. Since this as well as further changes and modifications are intended to be within the scope of the present invention, the above description should be construed as illustrative and not in a limiting sense, the scope of the invention being defined by the following claims.

I claim:

1. A cooking device disposable above a heating means for cooking an article of food comprising:
   a grill assembly comprising first and second grills and means for releaseably securing said grills together in confronting spaced relation whereby the article to be cooked is releaseably securable in the space between said grills;
   a post having one end secured to said grill assembly;
   a frame having an opening for receiving said grill assembly, said frame defining a channel along one side thereof and a space communicating with the top of said channel, said channel being dimensioned for slidably receiving the other end of said post, said space accommodating disengagement of said post from said channel;
   a pivot arm, means for rotatably securing said pivot arm at one end to said frame and at the other end to one side of said grill assembly substantially at the midpoint thereof; and
   handle means secured to said grill assembly for rotating said assembly substantially 180? about the axis thereof aligned with the rotation axis of said other end of said pivot arm for alternately exposing opposite surfaces of said food article to said heating means, said post traversing said channel during each rotation of said assembly.

2. The device according to claim 1, further comprising means for retaining said grill assembly in a horizontal orientation when not being rotated.

3. The device according to claim 2, wherein said pivot arm is disposed outside of said frame, said means for rotatably securing said other end of said pivot arm to said grill assembly extending through and seating in said channel when said grill assembly is in said horizontal orientation, said space communicating with said channel accommodating upward movement of said rotatable securing means during rotation, and wherein said means for retaining said grill assembly in the horizontal position comprises said rotatable securing means seating in said channel.

4. The device according to claim 1, further comprising a second post having one end secured to the opposite side of said grill assembly, said frame defining a second channel along said other side of said grill assembly and another space communicating with the top of said channel, said channel being dimensioned for slidably receiving the other end of said second post, and a second pivot arm and means for rotatably securing said second pivot arm at one end to said frame and at the other end to said other side of said grill assembly substantially at the midpoint thereof, said other space accommodating disengagement of said second post from said second channel, said second post traversing said other channel during each rotation of said assembly.

5. The device according to claim 1, wherein said handle means is secured to a side of said grill assembly parallel to said axis, said handle means comprising a rod having a handle member rotatably secured to one end thereof.

6. The device according to claim 1, further comprising a plurality of legs depending from said frame for supporting said device over said heating means.

7. The device according to claim 1, further comprising additional handle means secured to said frame for facilitating movement of said device.

8. The device according to claim 5, wherein said means for releaseably securing said grills together in confronting spaced relation comprises means for releaseably securing said grills together in adjustable confronting spaced relation.

9. The device according to claim 8, wherein said adjustable securing means comprises a first tubular member secured to one of said grills on said side of said grill assembly parallel to said axis, said rod being slidably received in said tubular member for securing said handle means to said grill assembly; a second tubular member secured to the other grill of said grill assembly on the same side as said first tubular member; and a locking member secured to said rod and having a plurality of spaced fingers dimensioned to be received in the bore of said second tubular member whereby said fingers may be inserted and retracted from said bore for releaseably securing said grills in adjustable spaced relation by sliding movement of said rod in said first tubular member.

10. The device according to claim 9, wherein said grills and said frame opening are rectangular.

11. The device according to claim 2, wherein said channel is straight and horizontally oriented.

12. The device according to claim 11, wherein said channel is in or near the plane defined by said grill assembly in said horizontal orientation.

13. The device according to claim 12, wherein said pivot arm is disposed outside of said frame on one side of said channel, said means for rotatably securing said other end of said pivot arm to said grill assembly extending through and seating in said channel when said grill assembly is in said horizontal orientation, said space communicating with said channel accommodating upward movement of said rotatable securing means during rotation, and wherein said means for retaining said grill assembly in the horizontal position comprises said rotatable securing means seating in said channel.

14. The device according to claim 13, further comprising a second post having one end secured to the side of said grill assembly opposite the side to which said first post is secured, said frame defining a second straight, horizontal channel extending along said opposite side of said grill assembly in or near said plane for slidably receiving the other end of said second post, and a second pivot arm disposed outside of said frame, and means for rotatably securing said second pivot arm at one end to said frame and at the other end to said opposite side of said grill assembly substantially at the midpoint thereof, said second post traversing said second channel during each rotation of said assembly, said means for rotatably securing said other end of said second pivot arm to said grill assembly extending through and seating in said second channel when said grill assembly is in said horizontal orientation, said frame defining another space communicating with the top of said second channel for accommodating upward movement of said rotatable securing means during rotation and for accommodating disengagement of said second post from said second channel.

15. The device according to claim 4, wherein said grills and said frame opening are rectangular.

16. The device according to claim 15, wherein said channel is straight and horizontally oriented.

17. The device according to claim 16, wherein said channel is in or near the plane defined by said grill assembly in said horizontal orientation.

* * * * *